United States Patent
Cheng et al.

(10) Patent No.: US 12,452,672 B1
(45) Date of Patent: Oct. 21, 2025

(54) DISTRIBUTED MULTILAYERED CYBERSECURITY FRAMEWORK FOR CONNECTED VEHICLES

(71) Applicant: VicOne Corporation, Tokyo (JP)

(72) Inventors: Yi-Li Cheng, Taipei (TW); Yi-Ting Chen, Taipei (TW)

(73) Assignee: VicOne Corporation, Tokyo (JP)

( * ) Notice: Subject to any disclaimer, the term of this patent is extended or adjusted under 35 U.S.C. 154(b) by 278 days.

(21) Appl. No.: 18/328,279

(22) Filed: Jun. 2, 2023

(51) Int. Cl.
*H04W 12/121* (2021.01)
*G07C 5/00* (2006.01)

(52) U.S. Cl.
CPC .......... *H04W 12/121* (2021.01); *G07C 5/008* (2013.01)

(58) Field of Classification Search
None
See application file for complete search history.

(56) References Cited

U.S. PATENT DOCUMENTS

| | | | | |
|---|---|---|---|---|
| 10,685,124 B2* | 6/2020 | Amano | ............ | H04L 12/40006 |
| 2012/0277949 A1* | 11/2012 | Ghimire | ............ | G05B 23/0275 701/31.7 |
| 2019/0104108 A1* | 4/2019 | Rhee | ............ | H04L 63/1425 |
| 2020/0134186 A1* | 4/2020 | Hong | ............ | G06F 21/575 |
| 2023/0119190 A1* | 4/2023 | Zachos | ............ | H04L 63/1433 726/22 |

FOREIGN PATENT DOCUMENTS

| WO | WO2017083862 A1 * | 5/2017 | ............ | H04L 12/40 |
|---|---|---|---|---|
| WO | WO2018013171 A1 * | 1/2018 | ............ | H04L 12/40 |

OTHER PUBLICATIONS

Yulia Gavrilova, "What is Anomaly Detection in Machine Learning?", https://serokell.io/blog/anomaly-detection-in-machine-learning, Dec. 10, 2021, downloaded May 24, 2023.
"Central Gateway (CGW) for Commercial Vehicles", https://www.bosch-mobility.com/en/solutions/vehicle-computer/central-gateway-cv/, Copyright 2023, downloaded May 12, 2023.
Erik Jaegervall, "Vehicle Signal Specification", https://github.com/COVESA/vehicle_signal_specification, Copyright 2023, downloaded Mar. 30, 2023.
"On-Board Diagnostics", https://en.wikipedia.org/wiki/On-board_diagnostics, Jul. 1, 2023, downloaded May 12, 2023.
"Signature-Based vs. Rule-Based WAFs: A Detailed Comparison", https://www.pentasecurity.com/blog/signature-based-vs-rule-based-wafs/#:~:text=Depending, Aug. 14, 2020, downloaded Mar. 23, 2023.

* cited by examiner

*Primary Examiner* — Paul R Fisher
(74) *Attorney, Agent, or Firm* — Beyer Law Group LLP

(57) ABSTRACT

A connected vehicle includes electronic control units (ECUs) that host onboard cybersecurity modules. The cybersecurity modules are part of a cybersecurity framework that protects the connected vehicle at various logical layers using signature-based modules and rule-based modules that are onboard hosted by the ECUs, and signature-based and anomaly-based modules that are offboard hosted by a computer system that is external to the connected vehicle. Attack techniques of a cyberattack are detected and correlated to validate detection of the cyberattack onboard the connected vehicle and offboard by the external computer system.

12 Claims, 7 Drawing Sheets

| | |
|---|---|
| LAYER 0 | • Onboard data sources |
| LAYER 1 | • Prevent anomalous access, filter out untrusted and unknown subjects using onboard rule-based modules<br>• Reduce onboard data to be analyzed in upper layers |
| LAYER 2 | • Data collection of system footprint and vehicle signals for onboard and offboard analysis<br>• Detect baseline violations using onboard rule-based modules |
| LAYER 3 | • Detect attack techniques using onboard signature-based modules |
| LAYER 4 | • Correlate detected attack techniques and short-term system footprint to validate detection of an attack using onboard signature-based module<br>• Aggregate system footprint for uploading |
| LAYER 5 | • Detect anomaly events using an offboard anomaly-based module<br>• Use an offboard signature-based module to correlate attack detected on the connected vehicle, anomaly event, and long-term system footprint |

FIG. 3

DISTRIBUTED MULTILAYERED CYBERSECURITY FRAMEWORK FOR CONNECTED VEHICLES

TECHNICAL FIELD

The present disclosure is directed to automotive cybersecurity.

BACKGROUND

A connected vehicle can communicate with devices or systems that are external to the vehicle. Most new vehicles on the market today are connected in that they have components that can perform external communication by wireless or wired connection. A connected vehicle may also have sensors for receiving sensed data of its physical environment.

Connected vehicles typically have a plurality of electronic control units (ECUs) that perform various functions. For example, a connected vehicle may have an ECU for the telematics control unit, in-vehicle infotainment, onboard diagnostics, central gateway, engine management, etc. ECUs are computers with software and hardware components. More particularly, an ECU has a processor that executes software components, such as an operating system, application programs, and/or firmware. Due to the complexity of ECUs, an original equipment manufacturer (OEM) of a connected vehicle sources one or more ECUs and/or software components thereof from third-party suppliers.

Cybersecurity, within the context of connected vehicles, is the protection of automotive electronic systems, communication networks, control algorithms, software, users, and underlying data from malicious attacks, damage, unauthorized access, or manipulation. Connected vehicles are susceptible to cyberattacks, which include unauthorized intrusion, malware infection, etc. Traditional information technology (IT) cybersecurity measures are not readily adaptable to connected vehicles because a typical ECU is not as powerful as computers employed in the general IT environment. The sourcing of ECUs and other components from many, different third-party suppliers and unique attack surfaces pose additional hurdles in adapting traditional IT cybersecurity measures to connected vehicles.

BRIEF SUMMARY

In one embodiment, a connected vehicle comprises electronic control units (ECUs) that host onboard cybersecurity modules. The cybersecurity modules are part of a cybersecurity framework that protects the connected vehicle at various logical layers using signature-based modules and rule based modules that are onboard hosted by the ECUs, and signature-based and anomaly-based modules that are offboard hosted by a computer system that is external to the connected vehicle. Attack techniques of a cyberattack are detected and correlated to validate detection of the cyberattack onboard the connected vehicle and offboard by the external computer system.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 shows logical layers of a cybersecurity framework for protecting a connected vehicle from cyberattacks in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
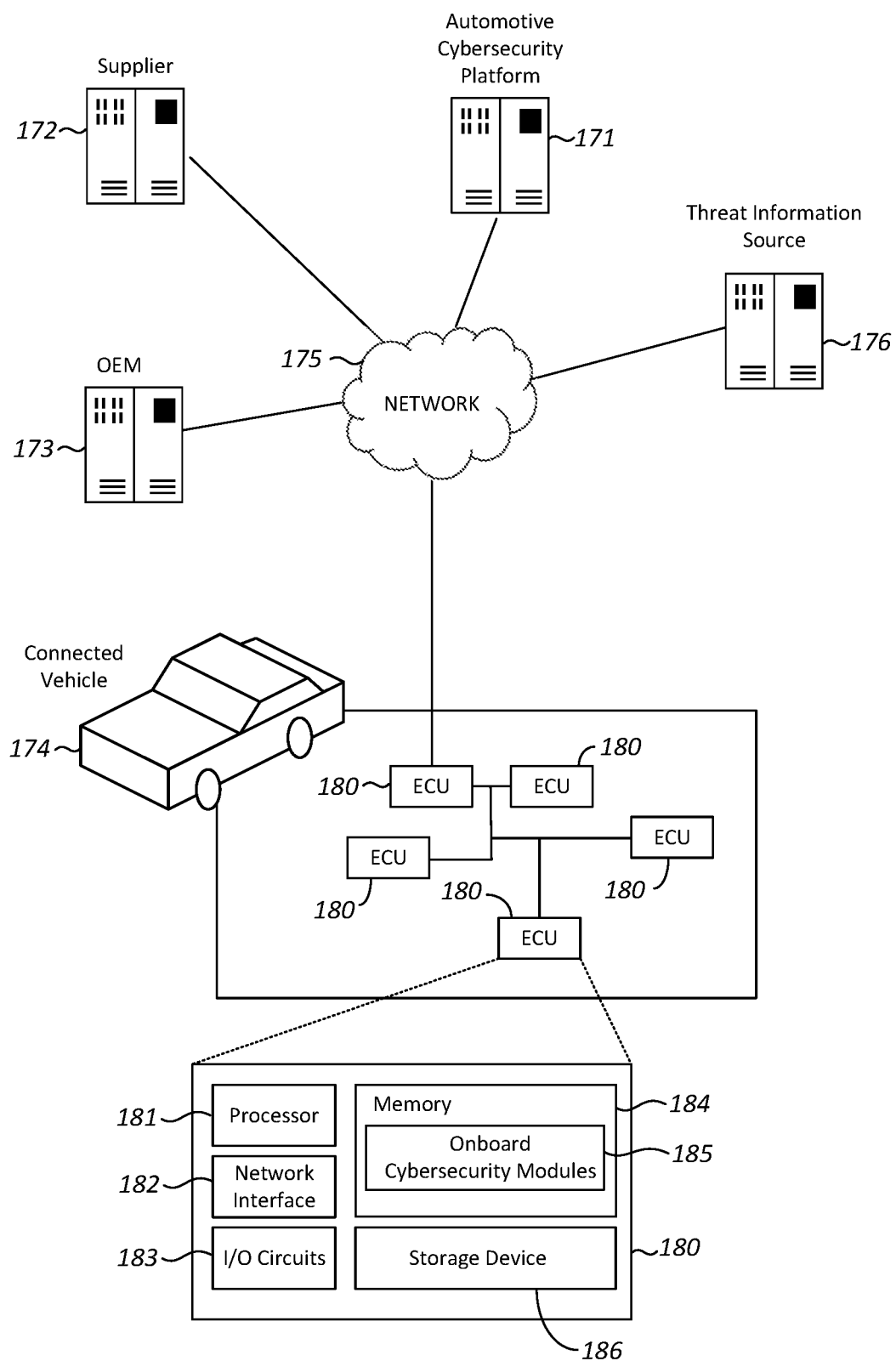
FIG. 1 shows a block diagram of a connected vehicle in accordance with an embodiment of the present invention.

FIG. 1 shows a block diagram of a connected vehicle 174 in accordance with an embodiment of the present invention. FIG. 1 shows a single connected vehicle 174, a single third-party supplier 172, and a single OEM 173 for illustration purposes only. As can be appreciated, there are many OEMs that manufacture connected vehicles that have components sourced from many, different third-party suppliers.

The connected vehicle 174 has a plurality of ECUs 180. An ECU 180 may be for a telematics control unit (TCU), in-vehicle infotainment (IVI), onboard diagnostics (e.g., OBD II), central gateway, engine management, Global Navigation Satellite System (GNSS), vehicle-to-everything (V2X) interfaces etc. One or more of the ECUs 180 and associated software components may be provided by the supplier 172 to the OEM 173, which is the manufacturer of the connected vehicle 174. The supplier 172 may provide firmware, source code, and/or other software components by removable storage media (e.g., Universal Serial Bus (USB) flash storage) or over a communication network 175, which includes the Internet in this example. Each of the OEM 173 and the supplier 172 is depicted as a computer system to indicate that the OEM 173 and the supplier 172 may send and receive software components and/or communicate with the connected vehicle 174 over the network 175.

An ECU 180 is a computer comprising at least one processor 181, a memory 184, one or more network interfaces 182 for connecting to an internal and/or external communication network, and one or more input/output (I/O) circuits 183. An I/O circuit 183 may be a data acquisition and control circuit, a sensor interface, or other circuit for receiving data from external sources, such as data from other connected vehicles, sensed data of the environment outside the connected vehicle 174, etc. The memory 184 may be non-volatile memory (e.g., non-volatile random access memory (NVRAM)) or volatile memory (e.g., dynamic random access memory (DRAM)). Instructions of one or more onboard cybersecurity modules 185 and other software components of the ECU 180 may be stored in the memory 184 for execution by the at least one processor 181. A storage device 186 may be a mass storage device, such as solid state drive (SSD). A particular ECU 180 may have fewer or more components depending on the function of the ECU 180.

An ECU 180 may be connected to other ECUs 180 over an internal (i.e., in-vehicle) communication network, such an Ethernet network or a Controller Area Network (CAN) onboard the connected vehicle 174. An ECU 180 may communicate with external devices outside of the connected vehicle 174 by way of a V2X network, vehicle ad-hoc network (VANET), Wi-Fi, or other external communication network.

An automotive cybersecurity platform 171 may comprise a computer system with associated software for supporting cybersecurity procedures in one or more connected vehicles. The cybersecurity platform 171 may comprise at least one processor and a memory, with the memory storing instructions that when executed by the at least one processor cause the cybersecurity platform to perform as described herein. The cybersecurity platform 171, which is external to the connected vehicle 174, may be implemented on a cloud computing platform (e.g., Amazon Web Services (AWS)™) or other computer system. The cybersecurity platform 171 may serve as a vehicle security operations center for the connected vehicle 174. The cybersecurity platform 171 may perform on-the-cloud, offboard (i.e., not on the connected vehicle 174) cybersecurity procedures for the connected vehicle 174, such as offboard anomaly event detection and offboard correlation.

In the example of FIG. 1, the cybersecurity modules 185 may be generated at the cybersecurity platform 171 and provided to the connected vehicle 174 at the factory by the OEM 173, over the communication network 175, or by removable storage media (e.g., USB flash storage). The cybersecurity modules 185 are configured to perform cybersecurity procedures as described herein. The cybersecurity modules 185 are onboard in that they are deployed on the connected vehicle 174.

A threat information source 176 may comprise a computer system that provides Common Vulnerabilities and Exposures (CVE) information, news of cyber threats, feedback from a bug bounty program, or other cyber threat intelligence. A vulnerability is a flaw or weakness in a software component (e.g., firmware, application program) or other component of an ECU. A vulnerability may be addressed directly with a patch that fixes the vulnerable component itself or indirectly with a virtual patch. Unlike a patch, a virtual patch does not fix the vulnerable component itself. Instead, the virtual patch monitors for and blocks an exploit of the vulnerability.

A cyberattack, which is also referred to herein simply as "attack", comprises one or more attack techniques. Attack techniques are operations that occur or are performed to perpetrate the cyberattack. As an example, a cyberattack that sends malicious CAN messages may include the following attack techniques: accessing vehicle credentials, using an exploit via Unified Diagnostic Services (UDS), performing network discovery, exploiting an operating system vulnerability, etc.

In one embodiment, a cybersecurity module for protecting a connected vehicle may be a rule-based module, an anomaly-based module, or a signature-based module. A cybersecurity module is implemented in software, but may work in conjunction with hardware components.

A rule-based module uses rules to prevent a cyberattack, with a rule defining a normal (i.e., good) operation or data. Examples of rules that are incorporated in rule-based modules include access control rules (defining what or who can access something), firewall rules (defining authorized network traffic), a CAN filter (defining allowed CAN messages), etc.

A signature-based module uses attack signatures to identify a known attack technique, i.e., a particular attack technique that has been discovered by cybersecurity researchers (e.g., human personnel of the cybersecurity platform 171). Once an attack technique is discovered, cybersecurity researchers may analyze the attack technique to extract features and other data indicative of the attack technique to create one or more attack signatures for identifying the attack technique. An attack signature may be expressed as a regular expression, for example. A virtual patch signature is an attack signature that is provided as a virtual patch. Signature-based modules have zero or almost zero false positives because the attack signatures are created from information on known attack techniques. A downside is that a signature-based module cannot detect an unknown attack technique.

An anomaly-based module detects an attack technique by monitoring for occurrence of one or more anomaly events, such as anomalous operations. As its name indicates, an anomaly event is not a normal event and is thus indicative of a cyberattack. Anomaly event detection is inherently complicated and prone to false positives, because an event may or may not be an anomaly depending on preceding and/or following events. For example, an access failure event (e.g., accessing a restricted component or data using an invalid credential as per an access control rule) is not necessarily an anomaly event because the access could just be inadvertent error.

A typical connected vehicle only has a few ECUs that have enough processing and storage resources to properly host a sophisticated cybersecurity module, such as an anomaly-based module. Furthermore, anomaly-based modules are prone to false positives, which can strain the limited storage and network bandwidth of the connected vehicle. Rule-based modules are also prone to false positives because they only indicate what is permitted. For example, an unpermitted operation is not necessarily by an attack technique.

As will be more apparent below, embodiments of the present invention provide a distributed, multilayered cybersecurity framework with onboard (i.e., on the connected vehicle) signature-based modules that work in conjunction with offboard (i.e., not on the connected vehicle) cybersecurity procedures to detect a cyberattack and validate detection of the cyberattack. Embodiments of the present invention allow for zero or almost zero false positives, and particularly address the needs and unique computing environment of a connected vehicle.

Figure 2:
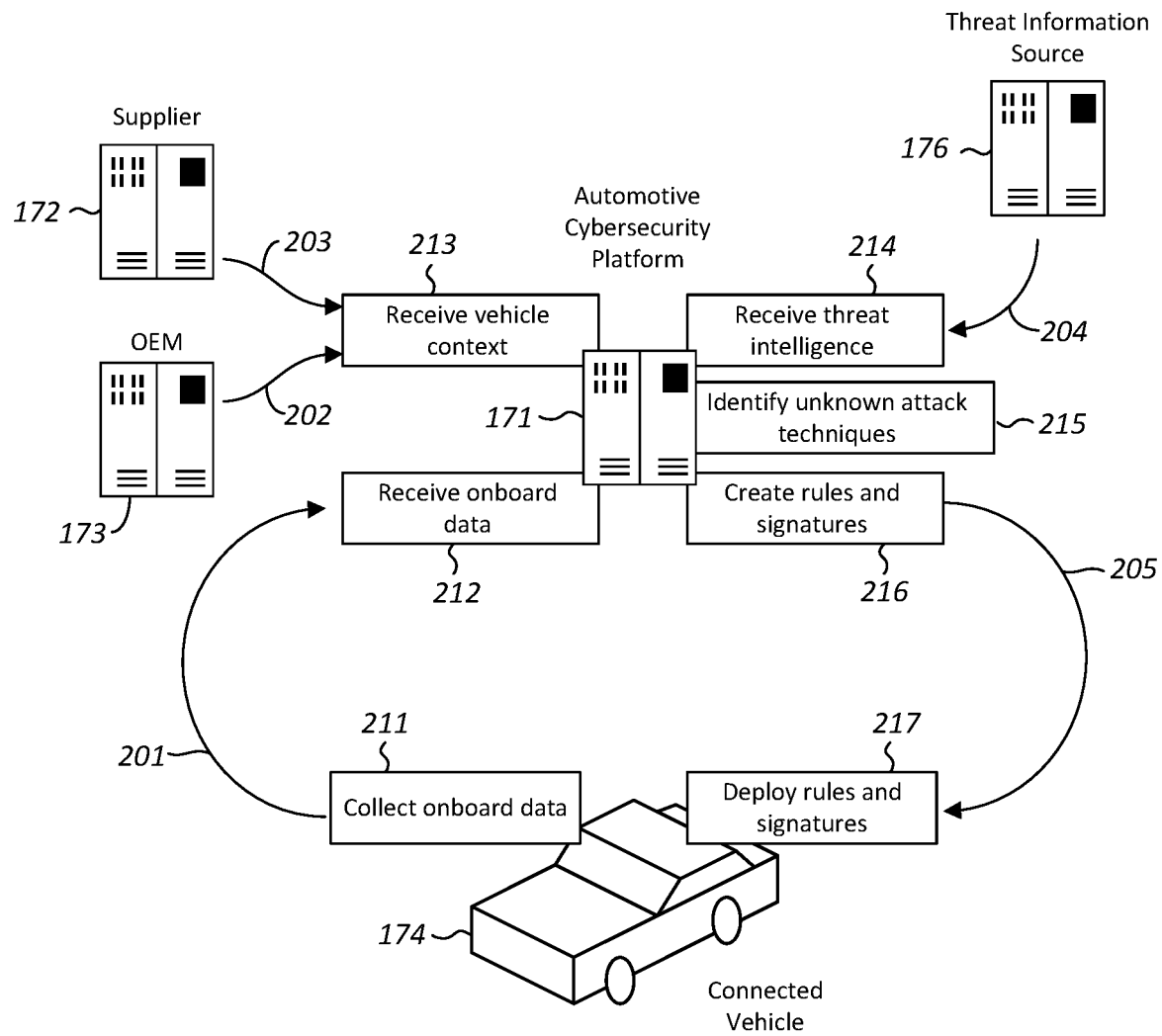
FIG. 2 shows a flow diagram of a process of protecting a connected vehicle from cyberattacks in accordance with an embodiment of the present invention.

FIG. 2 shows a flow diagram of protecting the connected vehicle 174 from cyberattacks, in accordance with an embodiment of the present invention.

In the example of FIG. 2, one or more onboard cybersecurity modules collect onboard data (step 211) of the connected vehicle 174 and transmit the onboard data to the cybersecurity platform 171 (see arrow 201). Onboard data are data detected in the connected vehicle 174, including network traffic on internal communication networks, CAN messages, sensor data, vehicle signals, data in ECUs, etc. The onboard data are received in the cybersecurity platform 171 (step 212).

The cybersecurity platform 171 further receives vehicle context (step 213) from the OEM 173 (see arrow 202) and the supplier 172 (see arrow 203). Vehicle context includes information on the design and components of the connected vehicle 174, including a software bill of materials (SBOM) of software components, ECU versions and makes, etc. The cybersecurity platform further receives threat intelligence (step 214) from the threat information source 176 (see arrow 204).

In the cybersecurity platform 171, onboard data from the connected vehicle 174, vehicle context, and threat intelligence are analyzed to identify one or more unknown attack techniques (step 215). As its name indicates, an unknown attack technique is previously unknown to cybersecurity researchers. Cybersecurity researchers may create a rule for preventing the (now known) attack technique and/or an attack signature for detecting the attack technique (step 216). For example, cybersecurity researchers may analyze the onboard data, vehicle context, and threat intelligence to identify attack techniques, identify features and patterns of the attack techniques, and create corresponding rules and attack signatures. Rules and attack signatures generated in the cybersecurity platform 171 are provided to the connected vehicle 174 (see arrow 205). In the connected vehicle 174, the rules and attack signatures are deployed (step 217) by incorporating them in corresponding onboard rule-based and signature-based modules.

In one embodiment, the connected vehicle 174 is protected by a distributed, multilayered cybersecurity framework. The cybersecurity framework is distributed in that cybersecurity procedures are distributed between the connected vehicle 174 and the cybersecurity platform 171, and multilayered in that it provides protection at several logical layers as now explained with reference to FIG. 3.

FIG. 3 shows logical layers of a cybersecurity framework for protecting a connected vehicle from cyberattacks in accordance with an embodiment of the present invention. In one embodiment, layer 0 is the bottom layer and layer 5 is the top layer. Layers 0-5 are depicted in FIG. 3 from the top of the page to the bottom of the page to match the order of the following description.

In the example of FIG. 3, layer 0 represents onboard data sources, such as Ethernet traffic, CAN messages, system calls, system logs, etc. Layer 1 represents onboard rule-based modules for system hardening to prevent unpermitted access to vehicle data and components, filter out untrusted and unknown data or subjects, and reduce onboard data to be analyzed in upper layers (i.e., layers 2-5). Layer 2 represents onboard cybersecurity modules for collecting onboard data, such as one or more filters for extracting and digesting system footprint and vehicle signals from onboard data. System footprint comprises onboard data that are relevant for cybersecurity. For example, system footprint may comprise data that are indicated in one or more CVE records or other threat intelligence. Vehicle signals may be those recognized by the Vehicle Signal Specification (VSS).

Layer 2 further represents onboard rule-based modules for detecting baseline violations. A baseline comprises rules for detecting normal or expected data. Data may be compared to baseline rules to determine if the data are normal. Data that do not meet baseline rules are declared as anomalous (not normal) and thus violate the baseline.

An example baseline is an application baseline, which comprises rules for detecting normal application programs that are expected to be on the connected vehicle. The application baseline may indicate, for each normal application program, the path to the application program, the permission of the application program, and the hash of the application program. Another example baseline is a CAN message baseline, which comprises rules for detecting normal CAN messages. The CAN message baseline 522 may indicate message identifiers, frequency, value range, etc. that are found in a normal CAN message dataset.

Layer 3 represents onboard signature-based modules for detecting attack techniques. Signature-based modules at layer 3 may include virtual patch signatures and attack signatures, both of which may be generated offboard from collected onboard data. Signature-based modules at layer 3 may also include CAN attack signatures, which detect attack techniques on the CAN bus.

Layer 4 represents onboard signature-based modules for correlating detected attack techniques with short-term system footprint to validate detection of a cyberattack. Layer 4 further represents filters for aggregating system footprint to create long-term system footprint that is uploaded to the cybersecurity platform 171. As its name indicates, long-term system footprint comprises data collected over a longer period of time compared to short-term system footprint.

Layer 5 represents an offboard anomaly-based module for detecting anomaly events and an offboard signature-based module for correlating a detected cyberattack with detected anomaly events to further validate detection of the cyberattack and thus further minimize false positives.

Figure 4:
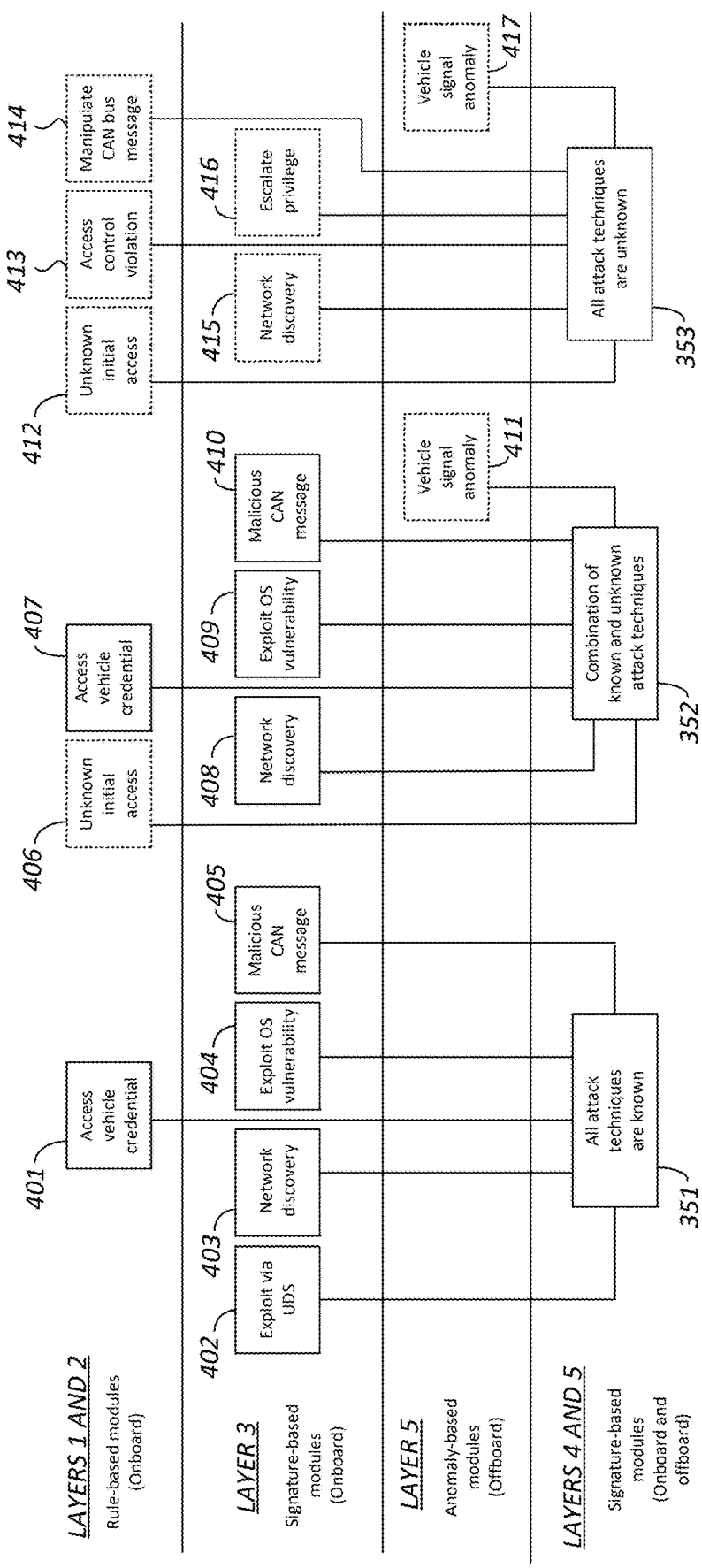
FIG. 4 illustrates how a cyberattack and attack techniques of the cyberattack may be identified at various logical layers of a cybersecurity framework in accordance with an embodiment of the present invention.

FIG. 4 illustrates how a cyberattack and attack techniques of the cyberattack may be identified at various logical layers of a cybersecurity framework in accordance with an embodiment of the present invention. Layer 0 is not shown in FIG. 4 for clarity of illustration. Particular examples of cyberattacks and attack techniques are provided for illustration purposes only. As can be appreciated, embodiments of the present invention are equally applicable to other cyberattacks and attack techniques.

As previously noted, a cyberattack comprises one or more attack techniques. An attack technique may be known or unknown. Accordingly, a cyberattack may consist of known attack techniques, unknown attack techniques, or a combination of known and unknown attack techniques.

In the example of FIG. 4, a cyberattack 351 consists of known attack techniques; the cyberattack 351 does not include any unknown attack technique. More particularly, the cyberattack 351 consists of attack techniques 401 (access of vehicle credential), 402 (exploit via Unified Diagnostic Services (UDS)), 403 (network discovery), 404 (exploit of an operating system vulnerability), and 405 (malicious CAN message). All of the attack techniques 401-405 are known.

As another example, a cyberattack 352 consists of known and unknown attack techniques. More particularly, the cyberattack 352 consists of attack techniques 406 (unknown initial access), 407 (access of vehicle credential), 408 (network discovery), 409 (exploit of an operating system vulnerability), 410 (malicious CAN message), and 411 (an anomaly event involving a vehicle signal). Attack techniques 407-410 are known, whereas attack techniques 406 and 411 are unknown.

As another example, a cyberattack 353 consists of unknown attack techniques; the cyberattack 353 does not include any known attack technique. More particularly, the cyberattack 353 consists of attack techniques 412 (unknown initial access), 413 (access control violation), 414 (CAN bus message manipulation), 415 (network discovery), 416 (unauthorized escalation of privilege), and 417 (an anomaly event involving a vehicle signal). All of the attack techniques 412-417 are unknown.

In the example of FIG. 4, onboard rule-based modules at layer 1 guard against the known attack techniques 401 and 407. For example, access control rules may be implemented to limit access to vehicle credentials, thereby preventing attack techniques 401 and 407.

At layer 3, onboard signature-based modules detect known attack techniques 402-405, and 408-410. Attack techniques 415 and 416 are unknown, and are thus not detectable at layer 3 at this time.

At layer 4, an onboard signature-based module correlates detection of attack techniques 401-405 and short-term system footprint to validate detection of the cyberattack 351. For example, short-term system footprint may be used as a condition to detect a cyberattack. As a particular example, to confirm that the cyberattack 351 has occurred, an onboard signature-based correlator may require a particular sequence of occurrence of the attack techniques 401-405, with the sequence of occurrence being available from timestamps of onboard data relating to the attack techniques 401-405.

At layer 5, an offboard signature-based module correlates the detection of the cyberattack 351 at layer 4 with long-term system footprint and detected anomaly events (if applicable) to further validate detection of the cyberattack 351 and obtain a high confidence that the cyberattack 351 was indeed detected.

It is to be noted that because the attack technique 406 is unknown, the cyberattack 352 cannot be detected or prevented with confidence until such time collected onboard data are analyzed to identify the attack technique 406 to create a corresponding rule that is deployed onboard. Similarly, the cyberattack 353 cannot be detected or prevented with confidence until such time collected onboard data are analyzed to identify the unknown attack techniques 412-416 to create corresponding rules and signatures that are deployed onboard.

Because attack techniques 411 and 417 are unknown, it is possible that cyberattacks 352 and 353 are not detectable until offboard anomaly-based modules have been updated to identify them. Collected onboard data along with samples from other sources may be used to update the offboard anomaly-based modules to identify the attack techniques 411 and 417. Thereafter, updated offboard anomaly-based modules may be used to detect the attack techniques 411 and 417 at layer 5.

Figure 5:
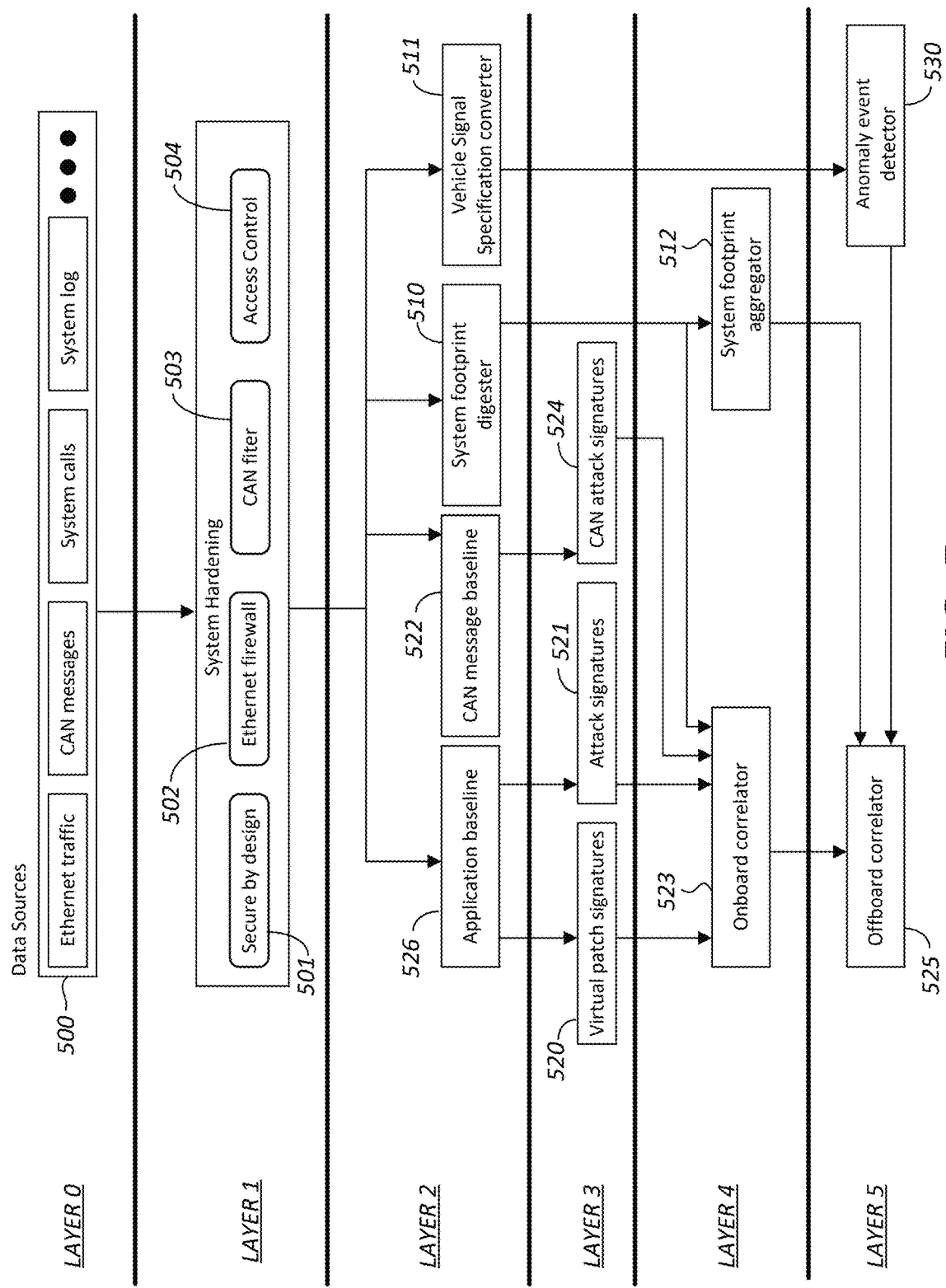
FIG. 5 shows a flow diagram of a process of protecting a connected vehicle from cyberattacks at different logical layers of a cybersecurity framework in accordance with an embodiment of the present invention.

FIG. 5 shows a flow diagram of a process of protecting a connected vehicle from cyberattacks at different logical layers of a cybersecurity framework in accordance with an embodiment of the present invention. The cybersecurity modules illustrated in FIG. 5 may be deployed in ECUs of a connected vehicle.

In the example of FIG. 5, onboard data from data sources (FIG. 5, 500) of a connected vehicle are represented at a layer 0 of the cybersecurity framework. The data at layer 0 may include data of Ethernet packets, CAN messages, system calls, system logs, etc. At layer 1, onboard rule-based modules are deployed for system hardening, including Ethernet firewall rules 502, CAN filters 503, and access control rules 504. System hardening at layer 1 may further include measures that are part of the original design of the connected vehicle (FIG. 5, 501), such as authentication and encryption. The onboard rule-based modules at layer 1 reduce the amount of data that are processed at the upper layers, i.e., layer 2 to layer 5.

At layer 2, a system footprint digester 510 and a vehicle signal specification (VSS) converter 511 serve as filters for preprocessing onboard data. The system footprint digester 510 collects short-term system footprint, which is provided to a system footprint aggregator 512 at layer 4. The system footprint aggregator 512 aggregates the system footprint from the system footprint digester 510 to generate long-term system footprint. The VSS converter 511 collects vehicle signals from onboard data, and converts the vehicle signals to a schema in accordance with the VSS schema convention for upload to an offboard anomaly-based anomaly event detector 530 at layer 5.

Also at layer 2, application baseline 526 and CAN message baseline 522 detect data that deviate from baseline. More particularly, application programs that do not meet the rules of the application baseline 526 are forwarded to layer 3 for evaluation using virtual patch signatures 520 and attack signatures 521. Similarly, CAN messages that do not meet the rules of the CAN message baseline 522 are forwarded to layer 3 for evaluation against the CAN attack signatures 524. Application programs and CAN messages that meet the rules of their respective baselines are regarded as normal.

At layer 3 are onboard signature-based modules comprising virtual patch signatures 520, attack signatures 521, and CAN attack signatures 524. Application programs that do not meet the rules of the application baseline 526 are evaluated using the virtual patch signatures 520 and attack signatures 521 to detect attack techniques. Similarly, CAN messages that do not meet the rules of the CAN message baseline 522 are evaluated using the CAN attack signatures to detect attack techniques involving the CAN bus.

At layer 4, to prevent false positives, a signature-based onboard correlator 523 correlates attack techniques detected at layer 3 with short-term system footprint from the system footprint digester 510, as applicable, to validate detection of a cyberattack. The short-term system footprint may serve as a condition to validate the cyberattack. Using an example from FIG. 4, a correlation signature for detecting attack 351 at layer 4 may be detecting attack techniques 401-405 happening within 300 seconds of each other (e.g., condition: 401 and 402 and 403 and 404 and 405, time: 300 seconds). As another example from FIG. 4, a correlation signature for detecting attack 351 at layer 4 may be detecting attack techniques 401-405 occurring in a specific sequence (e.g., condition: 401, then 402, then 403, then 404, and then 405).

Also at layer 4, the system footprint aggregator 512 aggregates the system footprint received from the system footprint digester 510 to generate long-term system footprint that is uploaded to a signature-based offboard correlator 525 at layer 5.

In one embodiment, the offboard anomaly event detector 530 is a machine learning model that has been trained to detect anomaly events from vehicle signals. At layer 5, the offboard anomaly event detector 530 receives the vehicle signals from the VSS converter 511 and classifies the vehicle signals to detect an anomaly event.

At layer 5, the offboard correlator 525 correlates the results of the onboard correlator 523, anomaly event detector 530, and long-term system footprint data from the system footprint aggregator 512, as applicable, to further validate a cyberattack detected on the connected vehicle. A correlation signature of the correlator 525 may condition the detection of a cyberattack with long-term system footprint and occurrence of one or more anomaly events. Using an example from FIG. 4, a correlation signature for the offboard correlator 525 may be the onboard correlator 523 validating that the cyberattack 351 has been detected within a time window where the anomaly event detector 530 detected a predetermined number of anomaly events.

Figure 6:
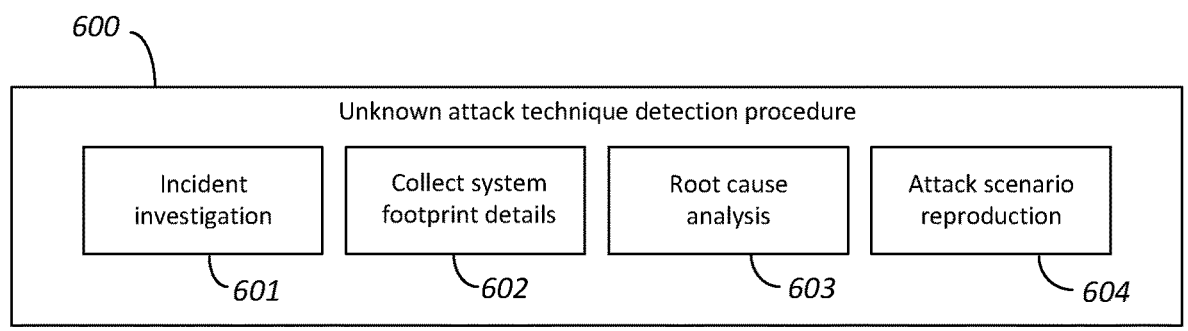
FIG. 6 shows a block diagram of an offboard cybersecurity procedure for identifying unknown attack techniques in accordance with an embodiment of the present invention.

FIG. 6 shows a block diagram of an offboard cybersecurity procedure 600 for identifying unknown attack techniques in accordance with an embodiment of the present invention. In the example of FIG. 6, collected onboard data and the results of the offboard anomaly event detector 530 (FIG. 5, 530) and offboard correlator 525 (FIG. 5, 525) are input to the procedure 600, which includes incident investigation (FIG. 6, 601), collection of details of system footprint (FIG. 6, 602), root cause analysis (FIG. 6, 603), and reproduction of a cyberattack scenario (FIG. 6, 604) to identify unknown attack techniques. Information obtained from the procedure 600 may be used to create rules and signatures that are incorporated in corresponding cybersecurity modules that are onboard the connected vehicle. As can be appreciated, identification of unknown attack techniques is personnel and computing resource intensive, and is thus best performed offboard.

Figure 7:
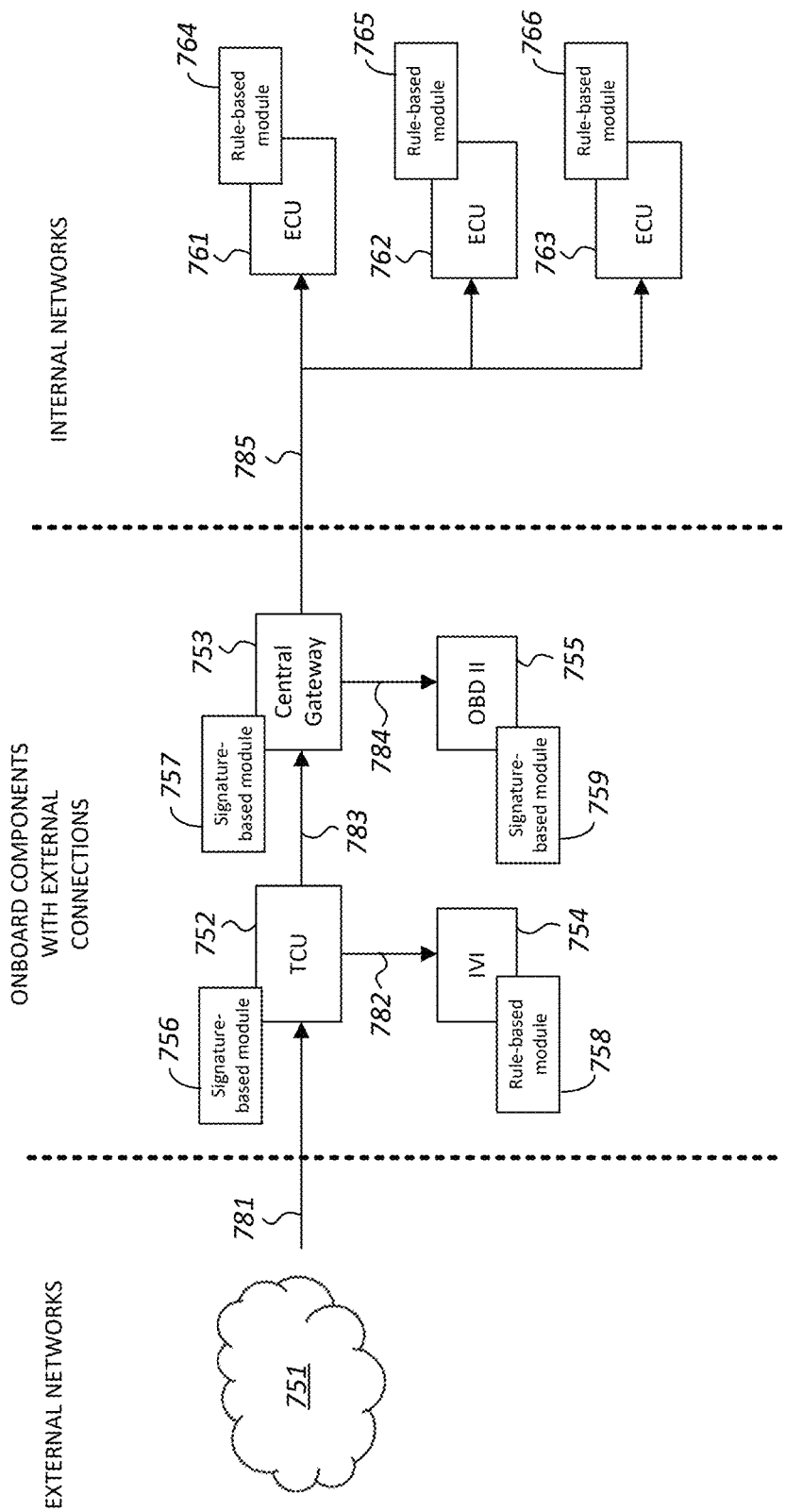
FIG. 7 illustrates how an example cyberattack is detected at various logical layers of a cybersecurity framework in accordance with an embodiment of the present invention.

FIG. 7 illustrates how an example cyberattack is detected at various logical layers of a cybersecurity framework in accordance with an embodiment of the present invention. In the example of FIG. 7, the cyberattack exploits a vulnerability in a telematics control unit (TCU) to gain entry to the connected vehicle. Once in the connected vehicle by way of the TCU, the cyberattack downloads and executes a malicious application program in an in-vehicle infotainment, conducts network discovery by way of a central gateway, escalates privileges by leveraging a vulnerability on an operating system of an onboard diagnostics (OBD II) ECU, and injects malicious CAN messages on the CAN bus. The aforementioned attack techniques are explained as being performed by the same cyberattack for illustration purposes only. As can be appreciated, these attack techniques may also be performed by several, unrelated cyberattacks.

In the example of FIG. 7, a connected vehicle includes the TCU 752, IVI 754, central gateway 753, and onboard diagnostics 755, which are ECUs that are configured to communicate with an external communication network 751 that may include the Internet or other external communication network. The ECUs 761-763 are ECUs that are connected to internal networks of the connected vehicle, such as a CAN bus. A cyberattack against any of the ECUs 761-763 is thus possible by way of the TCU 752 etc.

In the example of FIG. 7, the connected vehicle is protected by a cybersecurity framework as disclosed herein. More particularly, a signature-based module 756 (e.g., FIG. 5, attack signatures 521) deployed on the TCU 752 includes signatures for detecting one or more attack techniques of the cyberattack as it attempts to enter the connected vehicle (see arrow 781).

A rule-based module 758 (e.g., FIG. 5, application baseline 526) includes rules for identifying normal application programs that are expected to be on the connected vehicle. The rule-based module 758 is deployed on the IVI 754 to detect an attack technique involving downloading and executing a malicious application program to the IVI 754 (see arrow 782). The malicious application program does not meet the rules of the rule-based module 758 and is thus detected as an anomalous (i.e., not normal) application program.

A signature-based module 757 (e.g., FIG. 5, attack signatures 521) deployed on the central gateway 753 includes rules for detecting an attack technique that performs network discovery (see arrow 783) as part of the cyberattack. The network discovery performed by the attack technique is detected by the signature-based module 757. Similarly, a signature-based module 759 (e.g., FIG. 5, attack signatures 521) deployed on the onboard diagnostics 755 includes rules for detecting an attack technique that escalates privileges (see arrow 784). The escalation of privileges is detected by the signature-based module 759.

Rule-based modules 764-766 (e.g., FIG. 5, CAN message baseline 522) hosted on their respective ECUs 761-763 detect malicious CAN messages of the cyberattack that do not meet expected, normal CAN messages in terms of message format, frequency, etc. The rules-based modules 764-766 thus allow for blocking of malicious CAN messages on the CAN bus. As can be appreciated from the example of FIG. 7, attack techniques of the cyberattack may be detected and/or prevented on one or more ECUs of the connected vehicle as the cyberattack propagates on the connected vehicle. Remedial actions responsive to detecting an attack technique includes blocking the attack technique from performing its purpose, e.g., blocking entry into the connected vehicle, blocking execution and/or downloading of malicious application programs, blocking unpermitted network discovery, blocking unpermitted escalation of privileges, etc.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting a connected vehicle from a cyberattack, the method comprising:
    deploying a first signature-based module on a first electronic control unit (ECU) of a plurality of ECUs of the connected vehicle, the first signature-based module comprising instructions that are executed by at least one processor of the first ECU, the first signature-based module including a signature of a first attack technique of a plurality attack techniques of the cyberattack;
    deploying a second signature-based module on a second ECU of the plurality of ECUs of the connected vehicle, the second signature-based module comprising instructions that are executed by at least one processor of the second ECU, the second signature-based module including a signature of a second attack technique of the plurality attack techniques of the cyberattack;
    detecting the first attack technique on the first ECU;
    detecting the second attack technique on the second ECU; and
    validating detection of the cyberattack by correlating, onboard the connected vehicle, the detection of the first and second attack techniques with onboard data of the connected vehicle.

2. The method of claim 1, further comprising:
    detecting, offboard the connected vehicle, an anomaly event that occurred on the connected vehicle; and
    further validating detection of the cyberattack, offboard the connected vehicle, by correlating detection of the cyberattack with detection of the anomaly event.

3. The method of claim 1, further comprising:
    deploying a first rule-based module on a third ECU of the plurality of ECUs of the connected vehicle, the first rule-based module comprising instructions that are executed by at least one processor of the third ECU, the first rule-based module including rules that indicate application programs that are expected to be installed on the connected vehicle; and
    detecting a third attack technique of the plurality of attack techniques of the cyberattack on the third ECU, the third attack technique installing a malicious application program that does not meet the rules of the first rule-based module.

4. The method of claim 1, further comprising:
deploying a first rule-based module on a third ECU of the plurality of ECUs of the connected vehicle, the first rule-based module comprising instructions that are executed by at least one processor of the third ECU, the first rule-based module including rules that indicate normal control area network (CAN) messages; and
detecting a third attack technique of the plurality of attack techniques of the cyberattack on the third ECU, the third attack technique including a CAN message that does not meet the rules of the first rule-based module.

5. The method of claim 1, further comprising:
deploying a third signature-based module on a third ECU of the plurality of ECUs of the connected vehicle, the third signature-based module comprising instructions that are executed by at least one processor of the third ECU, the third signature-based module including a third signature for identifying a third attack technique of the plurality of attack techniques of the cyberattack, the third attack technique involving injection of malicious messages on a controller area network (CAN) bus; and
detecting the third attack technique on the third ECU.

6. A method of protecting a connected vehicle from cyberattacks, the method comprising:
identifying, using a first signature that is onboard a connected vehicle, a first attack technique of a plurality of attack techniques of a first cyberattack;
identifying, using a second signature that is onboard the connected vehicle, a second attack technique of the plurality of attack techniques of the first cyberattack;
identifying, on an external computer system that is external to the connected vehicle, a third attack technique of the plurality of attack techniques of the first cyberattack from onboard data that are collected on the connected vehicle;
deploying a third signature onboard the connected vehicle, the third signature being deployed on the connected vehicle after identifying the third attack technique on the external computer system;
identifying, using the third signature, the third attack technique onboard the connected vehicle; and
detecting the first cyberattack on the connected vehicle at least in response to detecting the first, second, and third attack techniques on the connected vehicle.

7. The method of claim 6, further comprising:
correlating the first, second, and third attack techniques to validate detection of the first cyberattack on the connected vehicle to generate a first correlation result.

8. The method of claim 7, further comprising:
on the external computer system, correlating the first correlation result with an anomaly event on the connected vehicle to further validate detection of the first cyberattack on the connected vehicle.

9. A system comprising:
a connected vehicle comprising:
a first electronic control unit (ECU) of a plurality of ECUs of the connected vehicle, the first ECU comprising a memory and at least one processor, the memory of the first ECU storing instructions of a first signature-based module that includes a first signature for detecting a first attack technique of a plurality of attack techniques of a cyberattack, wherein the instructions stored in the memory of the first ECU, when executed by the at least one processor of the first ECU, cause the first ECU to detect the first attack technique;
a second ECU of the plurality of ECUs of the connected vehicle, the second ECU comprising a memory and at least one processor, the memory of the second ECU storing instructions of a second signature-based module that includes a second signature for detecting a second attack technique of the plurality of attack techniques of the cyberattack, wherein the instructions stored in the memory of the second ECU, when executed by the at least one processor of the second ECU, cause the second ECU to detect the second attack technique; and
a third ECU of the plurality of ECUs of the connected vehicle, the third ECU comprising a memory and at least one processor, the memory of the third ECU storing instructions of a third signature-based module that includes a third signature for validating detection of the cyberattack, wherein the instructions stored in the memory of the third ECU, when executed by the at least one processor of the third ECU, cause the third ECU to correlate detection of the first and second attack techniques with onboard data of the connected vehicle; and
a computer system that is external to the connected vehicle, the computer system comprising at least one processor and a memory, the memory of the computer system storing instructions that when executed by the at least one processor of the computer system cause the computer system to correlate detection of the cyberattack on the connected vehicle with an anomaly event on the connected vehicle.

10. The connected vehicle of claim 9, wherein the instructions stored in the memory of the computer system, when executed by the at least one processor of the computer system, cause the computer system to:
receive collected onboard data from the connected vehicle; and
provide an update to the first signature-based module, the update including a fourth signature for detecting a third attack technique of the plurality of attack techniques of the cyberattack, the fourth signature being generated based on information from the collected onboard data.

11. The system of claim 9, wherein the connected vehicle further comprises:
a fourth ECU of the plurality of ECUs of the connected vehicle, the fourth ECU comprising a memory and at least one processor, the memory of the fourth ECU storing instructions of a first rule-based module that includes rules that indicate application programs that are expected to be installed on the connected vehicle,
wherein the instructions stored in the memory of the fourth ECU, when executed by the at least one processor of the fourth ECU, cause the fourth ECU to detect a third attack technique of the plurality of attack techniques of the cyberattack,
wherein the third attack technique installs a malicious application program that does not meet the rules of the first rule-based module.

12. The system of claim 9, wherein the connected vehicle further comprises:
a fourth ECU of the plurality of ECUs of the connected vehicle, the fourth ECU comprising a memory and at least one processor, the memory of the fourth ECU storing instructions of a second rule-based module that includes rules that indicate normal control area network (CAN) messages, wherein the instructions stored in the memory of the fourth ECU, when executed by the at least one processor of the fourth ECU, cause the fourth ECU to detect a fourth attack technique of the plurality of attack techniques of the cyberattack, wherein the fourth attack technique injects a malicious CAN message that does not meet the rules of the second rule-based module.

\* \* \* \* \*